(12) United States Patent
Nye

(10) Patent No.: US 9,776,311 B2
(45) Date of Patent: *Oct. 3, 2017

(54) FASTENER EXTRACTION RATCHET BIT SYSTEM

(71) Applicant: Kevin D. Nye, Meeker, CO (US)

(72) Inventor: Kevin D. Nye, Meeker, CO (US)

( * ) Notice: Subject to any disclaimer, the term of this patent is extended or adjusted under 35 U.S.C. 154(b) by 318 days.

This patent is subject to a terminal disclaimer.

(21) Appl. No.: 14/620,178

(22) Filed: Feb. 11, 2015

(65) Prior Publication Data

US 2015/0360357 A1 Dec. 17, 2015

Related U.S. Application Data

(63) Continuation-in-part of application No. 14/303,666, filed on Jun. 13, 2014, now Pat. No. 9,440,342.

(51) Int. Cl.
   *B25B 27/18* (2006.01)
   *B23B 51/08* (2006.01)
   *B23B 31/00* (2006.01)

(52) U.S. Cl.
   CPC ............ *B25B 27/18* (2013.01); *B23B 31/005* (2013.01); *B23B 31/008* (2013.01); *B23B 2231/0256* (2013.01); *B23B 2231/04* (2013.01); *Y10T 408/89* (2015.01)

(58) Field of Classification Search
   CPC ....... B25B 27/18; B25B 21/02; B23B 31/008; B23B 31/005; B23B 2231/0256; B23B 2231/04; Y10T 408/89
   See application file for complete search history.

(56) References Cited

U.S. PATENT DOCUMENTS

| | | | |
|---|---|---|---|
| 4,062,078 A | 12/1977 | Brutschy | |
| 4,713,990 A | 12/1987 | Poling | |
| 4,818,157 A * | 4/1989 | Kouvelis | B23B 31/005 279/145 |
| 5,074,025 A * | 12/1991 | Willard, III | B23B 31/005 279/103 |
| 5,222,848 A | 6/1993 | Kuang-Wu | |
| 5,328,308 A * | 7/1994 | Ducker, III | B23B 31/005 407/30 |
| 5,405,221 A * | 4/1995 | Ducker, III | B23B 31/005 279/83 |
| 5,722,805 A | 3/1998 | Giffin | |
| 6,572,311 B2 * | 6/2003 | Vasudeva | B23B 31/005 408/226 |
| 6,742,416 B2 | 6/2004 | Bergamo | |
| 7,007,573 B2 * | 3/2006 | Kozak | B25B 13/065 30/167 |

(Continued)

FOREIGN PATENT DOCUMENTS

CA 1280917 3/1991

*Primary Examiner* — David B Thomas

(57) ABSTRACT

A fastener extraction ratchet bit system for facilitating extraction of stripped fasteners by permitting attachment of extraction bits to an air drive ratchet. The system includes a driving tool and a fitting coupled to and extending from the driving tool. A drill socket is coupled to a drill bit wherein the drill bit is selectively couplable to the fitting such that the driving tool provides a driving force to the drill bit. An extraction socket is coupled to an extraction bit wherein the extraction bit is also selectively couplable to the fitting such that the driving tool provides the driving force to the extraction bit.

11 Claims, 4 Drawing Sheets

(56) References Cited

U.S. PATENT DOCUMENTS

| | | | | |
|---|---|---|---|---|
| 7,112,020 | B2* | 9/2006 | Sheffler | B23B 31/005 |
| | | | | 279/83 |
| 7,766,585 | B2* | 8/2010 | Vasudeva | B23B 31/005 |
| | | | | 279/22 |
| D626,575 | S | 11/2010 | Washington, III | |
| 7,824,137 | B2* | 11/2010 | Vasudeva | B23B 31/008 |
| | | | | 206/379 |
| 8,016,523 | B2* | 9/2011 | Vasudeva | B23B 31/005 |
| | | | | 279/22 |
| 8,955,415 | B2* | 2/2015 | Lin | B25B 27/18 |
| | | | | 81/441 |
| 9,440,342 | B2* | 9/2016 | Nye | B25B 27/18 |
| 2005/0204542 | A1* | 9/2005 | Pittman | B23B 47/284 |
| | | | | 29/566 |
| 2011/0008114 | A1* | 1/2011 | Wang | B23B 29/24 |
| | | | | 407/44 |
| 2011/0097170 | A1* | 4/2011 | Miller | B25B 27/18 |
| | | | | 408/226 |
| 2014/0183827 | A1* | 7/2014 | Keightley | B23B 31/005 |
| | | | | 279/30 |
| 2015/0075331 | A1* | 3/2015 | Catalano | B25B 27/18 |
| | | | | 81/53.2 |

\* cited by examiner

__US 9,776,311 B2__

1

FASTENER EXTRACTION RATCHET BIT SYSTEM

CROSS REFERENCE TO RELATED APPLICATIONS

This application is a continuation in part of application Ser. No. 14/303,666 filed Jun. 13, 2014.

BACKGROUND OF THE DISCLOSURE

Field of the Disclosure

The disclosure relates to bit systems and more particularly pertains to a new bit system for facilitating extraction of stripped fasteners by permitting attachment of extraction bits to an air drive ratchet.

SUMMARY OF THE DISCLOSURE

An embodiment of the disclosure meets the needs presented above by generally comprising a driving tool and a fitting coupled to and extending from the driving tool. A drill socket is coupled to a drill bit wherein the drill bit is selectively couplable to the fitting such that the driving tool provides a driving force to the drill bit. An extraction socket is coupled to an extraction bit wherein the extraction bit is also selectively couplable to the fitting such that the driving tool provides the driving force to the extraction bit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
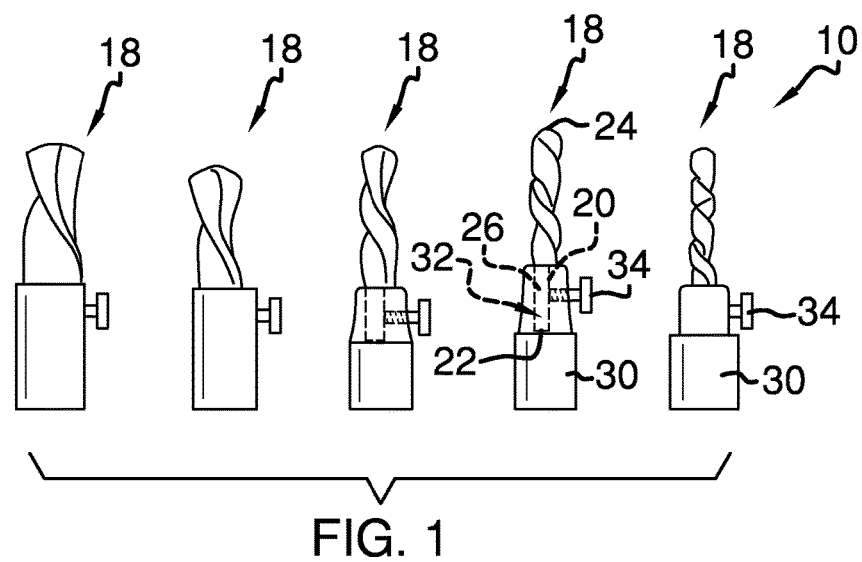
FIG. 1 is a front view of extraction bits of a fastener extraction ratchet bit system according to an embodiment of the disclosure.
Figure 2:
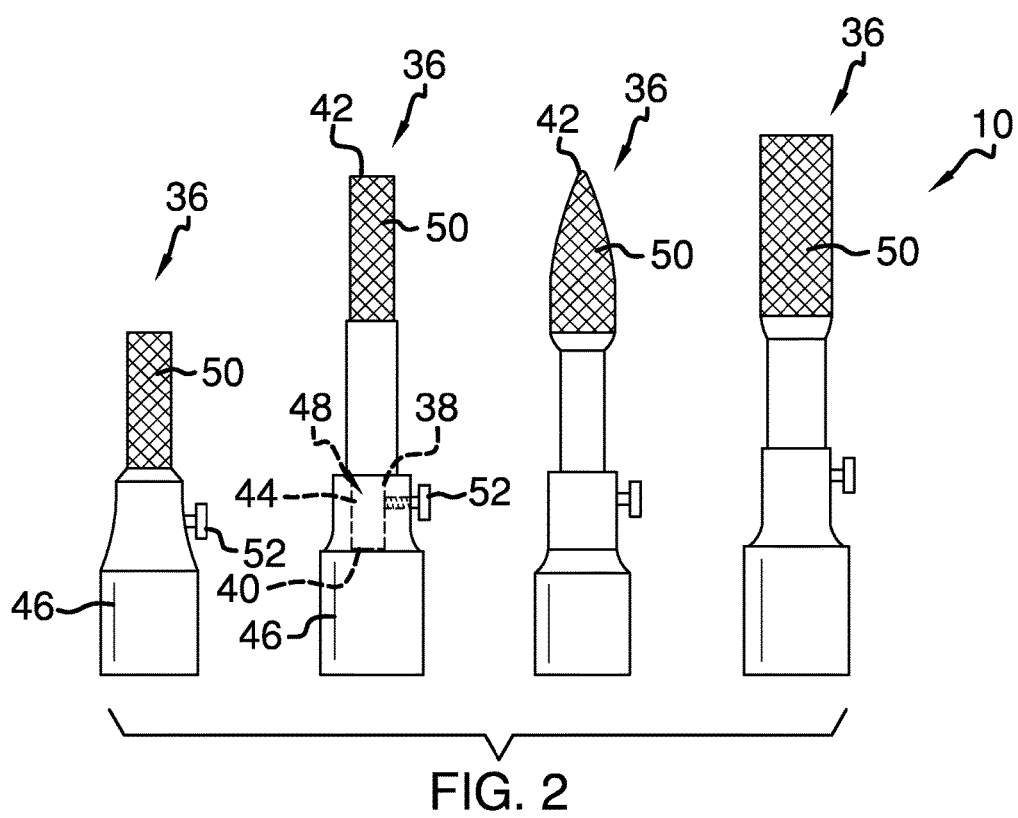
FIG. 2 is a front view of burr bits of an embodiment of the disclosure.
Figure 3:
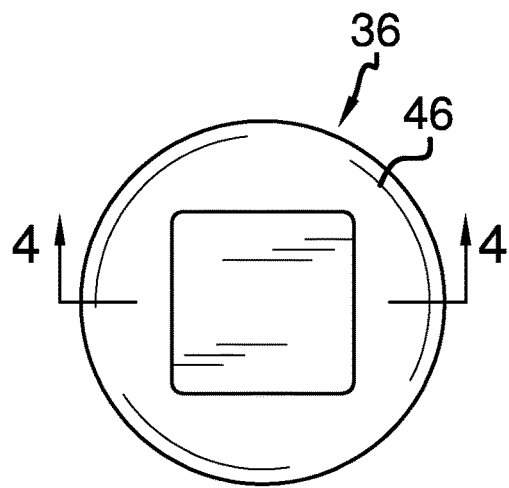
FIG. 3 is a bottom view of a ratchet socket of a bit of an embodiment of the disclosure.
Figure 4:
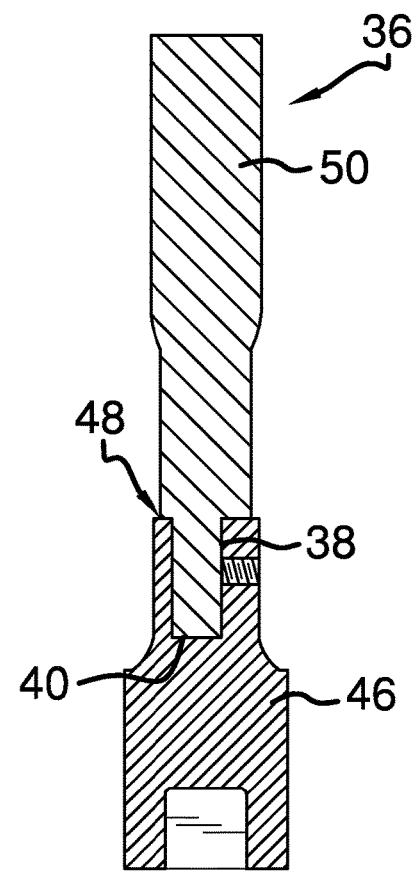
FIG. 4 is a cross-sectional view of an embodiment of the disclosure taken along line 4-4 of FIG. 3.
Figure 5:
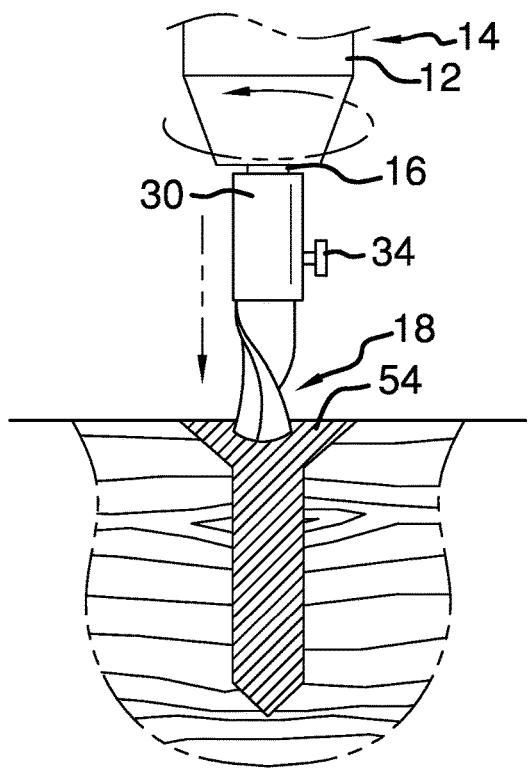
FIG. 5 is a partial cut-away side view of an embodiment of the disclosure in use.
Figure 6:
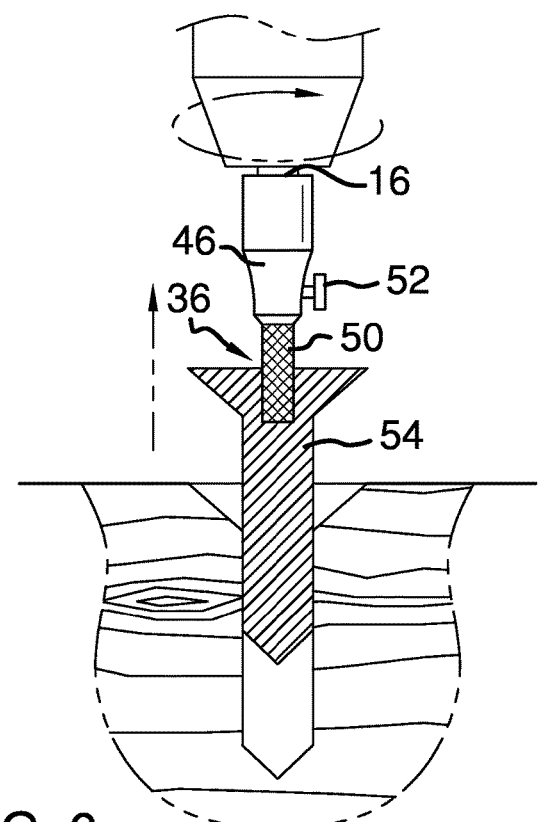
FIG. 6 is a partial cut-away side view of an embodiment of the disclosure in use.
Figure 7:
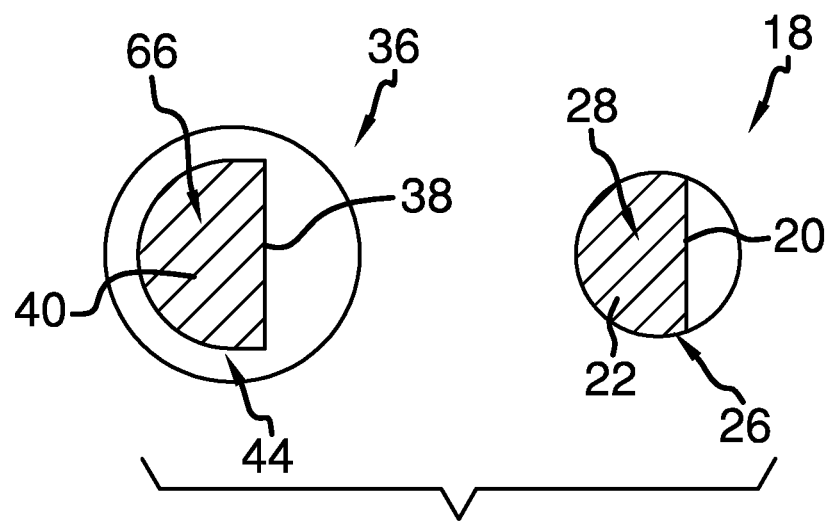
FIG. 7 is a bottom view of a drill bit and an extraction bit of an embodiment of the disclosure.

With reference now to the drawings, and in particular to FIGS. 1 through 7 thereof, a new bit system embodying the principles and concepts of an embodiment of the disclosure and generally designated by the reference numeral 10 will be described.

As best illustrated in FIGS. 1 through 7, the fastener extraction ratchet bit system 10 generally comprises a driving tool 12. The driving tool 12 is an impact wrench 14 such that the driving tool 12 is positionable in an enclosed or otherwise difficult to access space. A fitting 16 is coupled to and extends from the driving tool 12. The fitting 16 may be of conventional design for socket tools. Each of a plurality of drill bits 18 has a respective flat surface 20 extending parallel to a longitudinal axis of the drill bit 18. The flat surface 20 extends from a base end 22 of the drill bit 18 towards a distal end 24 of the drill bit 18 relative to the base end 22. The flat surface 20 defines a base end section 26 of each drill bit 18 having a D-shaped cross-sectional shape 28 transverse to the longitudinal axis of the drill bit 18. Each drill bit 18 may have either or both of a unique diameter extending from the base end section 26 and a unique length extending from the base end section 26. Thus, the drill bits 18 define a collection of sizes to permit selection of a desired diameter and a desired drilling depth. The base end section 26 of each of the drill bits 18 is uniform in shape and size wherein each of the drill bits 18 is selectively fastenable to a drill socket 30. The drill socket 30 is selectively couplable to the fitting 16. The drill socket 30 is structured to have a drill bit aperture 32 extending into the drill socket 30. The drill bit aperture 32 is complementary in shape to the base end section 26 of each drill bit 18 wherein the base end section 26 is insertable into the drill bit aperture 32 such that the driving tool 12 provides a driving force to a selectable one of the drill bits 18 coupled to the drill socket 30. A drill bit set screw 34 is coupled to and extends through the drill socket 30. The drill bit set screw 34 is aligned with the flat surface 20 when each drill bit 18 is inserted into the drill socket 30. The drill bit set screw 34 is extendable into the drill socket 30 to engage the flat surface 20 of each drill bit 18 wherein each drill bit 18 is fastenable to the drill socket 30.

Similarly, each of a plurality of extraction bits 36 has a respective planar surface 38 extending parallel to a longitudinal axis of the extraction bit 36. The planar surface 38 extends from a bottom end 40 of the extraction bit 36 towards a distal end 42 of the extraction bit 36 relative to the bottom end 40. The planar surface 38 defines a bottom end section 44 having a D-shaped cross-sectional shape 46 transverse to the longitudinal axis of the extraction bit 36. Each extraction bit 36 may have one or both of a uniquely shaped head section 50 and a unique length extending between the bottom end section 44 and the head section 50. An extraction socket 46 is selectively couplable to the fitting 16. The extraction socket 46 is structured to have an extraction bit aperture 48 extending into the extraction socket 46. The extraction bit aperture 48 is complementary to the bottom end section 44 of each extraction bit 36 wherein the bottom end section 44 is insertable into the extraction bit aperture 48 such that the driving tool 12 provides a driving force to a selectable one of the extraction bits 36. An extraction bit set screw 52 is coupled to and extends through the extraction socket 46. The extraction bit set screw 52 is aligned with the planar surface 38 when each extraction bit 36 is inserted into the extraction bit aperture 48 wherein the extraction bit set screw 52 is extendable into the extraction socket 46 to engage the planar surface 38 wherein each extraction bit 36 is fastenable to the extraction socket 46. The size and shape of each base end section 26 and each bottom end section 44 may be identical wherein the extraction socket 46 and extraction bit set screw 52 would be interchangeable with the drill socket 30 and drill bit set screw 34.

In use, a desired drill bit 18 is coupled to the drill socket 30 and secured by the drill bit set screw 34. The drill socket 30 is coupled to the fitting 16. The drill bit 18 is used to drill into a fastener 54 to remove material from a head 56 preparing the fastener 54 for extraction. A desired extraction bit 36 is then coupled to the driving tool 12 in a similar manner replacing the drill bit 18. The driving tool is then repositioned to engage the extraction bit 36 to the fastener 54. The driving tool 12 is activated wherein the extraction bit 36 extracts the fastener 54. This use is exemplary in that the above described bit fastening system 10 may be employed to provide interchangeable bits for various types of driving tools and for various purposes.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A driving tool bit fastening system comprising:
   a driving tool;
   a fitting coupled to and extending from said driving tool;
   a drill bit, said drill bit having a flat surface extending parallel to a longitudinal axis of said drill bit, said flat surface extending from a base end of said drill bit towards a distal end of said drill bit relative to said base end, said flat surface defining a base end section of said drill bit having a D-shaped cross-sectional shape transverse to said longitudinal axis of said drill bit;
   a drill socket being selectively couplable to said fitting, said drill socket being structured to have a drill bit aperture extending into said drill socket, said drill bit aperture being complementary to said base end section wherein said base end section is insertable into said drill bit aperture such that said driving tool provides a driving force to said drill bit; and
   a drill bit set screw coupled to and extending through said drill socket, said drill bit set screw being aligned with said flat surface wherein said drill bit set screw is extendable into said drill socket to engage said flat surface wherein said drill bit is fastened to said drill socket.

2. The system of claim 1, further comprising:
   an extraction bit, said extraction bit having a planar surface extending parallel to a longitudinal axis of said extraction bit, said planar surface extending from a bottom end of said extraction bit towards a distal end of said extraction bit relative to said bottom end, said planar surface defining a bottom end section having a D-shaped cross-sectional shape transverse to said longitudinal axis of said extraction bit; and
   an extraction socket being selectively couplable to said fitting, said extraction socket being structured to have an extraction bit aperture extending into said extraction socket, said extraction bit aperture being complementary to said bottom end section wherein said bottom end section is insertable into said extraction bit aperture such that said driving tool provides a driving force to said extraction bit; and
   an extraction bit set screw coupled to and extending through said extraction socket, said extraction bit set screw being aligned with said planar surface wherein said extraction bit set screw is extendable into said extraction socket to engage said planar surface wherein said extraction bit is fastened to said extraction socket.

3. The system of claim 2, further comprising a plurality of said extraction bits, each of said extraction bits having a respective uniquely sized head section, said bottom end section of each of said extraction bits being uniform in shape wherein each of said extraction bits is selectively fastenable to said extraction socket.

4. The system of claim 2, further comprising a plurality of said extraction bits, each of said extraction bits having a unique length extending between said bottom end section and a respective head section of said extraction bit, said bottom end section of each of said extraction bits being uniform in shape wherein each of said extraction bits is selectively fastenable to said extraction socket.

5. The system of claim 1, further comprising a plurality of said drill bits, each of said drill bits having a unique diameter extending from said base end section, said base end section of each of said drill bits being uniform in shape wherein each of said drill bits is selectively fastenable to said drill socket.

6. The system of claim 1, further comprising said driving tool being an impact wrench.

7. The system of claim 1, further comprising a plurality of said drill bits, each of said drill bits having a unique length extending from said base end section, said base end section of each of said drill bits being uniform in shape wherein each of said drill bits is selectively fastenable to said drill socket.

8. A driving tool bit fastening system comprising:
   an extraction bit, said extraction bit having a planar surface extending parallel to a longitudinal axis of said extraction bit, said planar surface extending from a bottom end of said extraction bit towards a distal end of said extraction bit relative to said bottom end, said planar surface defining a bottom end section having a D-shaped cross-sectional shape transverse to said longitudinal axis of said extraction bit; and
   an extraction socket being selectively couplable to said fitting, said extraction socket being structured to have an extraction bit aperture extending into said extraction socket, said extraction bit aperture being complementary to said bottom end section wherein said bottom end section is insertable into said extraction bit aperture such that said driving tool provides a driving force to said extraction bit; and
   an extraction bit set screw coupled to and extending through said extraction socket, said extraction bit set screw being aligned with said planar surface wherein said extraction bit set screw is extendable into said extraction socket to engage said planar surface wherein said extraction bit is fastened to said extraction socket.

9. The system of claim 8, further comprising a plurality of said extraction bits, each of said extraction bits having a respective uniquely sized head section, said bottom end section of each of said extraction bits being uniform in shape wherein each of said extraction bits is selectively fastenable to said extraction socket.

10. The system of claim 8, further comprising a plurality of said extraction bits, each of said extraction bits having a unique length extending between said bottom end section and a respective head section of said extraction bit, said bottom end section of each of said extraction bits being uniform in shape wherein each of said extraction bits is selectively fastenable to said extraction socket.

11. A driving tool bit fastening system comprising:

a driving tool, said driving tool being an impact wrench;

a fitting coupled to and extending from said driving tool;

a plurality of drill bits, each said drill bit having a respective flat surface extending parallel to a longitudinal axis of said drill bit, said flat surface extending from a base end of said drill bit towards a distal end of said drill bit relative to said base end, said flat surface defining a base end section of each said drill bit having a D-shaped cross-sectional shape transverse to said longitudinal axis of said drill bit;

a drill socket being selectively couplable to said fitting, said drill socket being structured to have a drill bit aperture extending into said drill socket, said drill bit aperture being complementary to said base end section of each said drill bit wherein said base end section is insertable into said drill bit aperture such that said driving tool provides a driving force to a selectable one of said drill bits coupled to said drill socket;

a drill bit set screw coupled to and extending through drill socket, said drill bit set screw being aligned with said flat surface when each said drill bit is inserted into said drill socket wherein said drill bit set screw is extendable into said drill socket to engage said flat surface of each said drill bit wherein each said drill bit is fastenable to said drill socket;

a plurality of extraction bits, each said extraction bit having a respective planar surface extending parallel to a longitudinal axis of said extraction bit, said planar surface extending from a bottom end of said extraction bit towards a distal end of said extraction bit relative to said bottom end, said planar surface defining a bottom end section having a D-shaped cross-sectional shape transverse to said longitudinal axis of said extraction bit;

an extraction socket being selectively couplable to said fitting, said extraction socket being structured to have an extraction bit aperture extending into said extraction socket, said extraction bit aperture being complementary to said bottom end section of each said extraction bit wherein said bottom end section is insertable into said extraction bit aperture such that said driving tool provides a driving force to a selectable one of said extraction bits; and an extraction bit set screw coupled to and extending through said extraction socket, said extraction bit set screw being aligned with said planar surface when each said extraction bit is inserted into said extraction bit aperture wherein said extraction bit set screw is extendable into said extraction socket to engage said planar surface wherein each said extraction bit is fastenable to said extraction socket.

* * * * *